UNITED STATES PATENT OFFICE.

OTTO ERNST, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

RED LAKE.

No. 830,312.     Specification of Letters Patent.     Patented Sept. 4, 1906.

Application filed February 4, 1905. Serial No. 244,174. (Specimens.)

*To all whom it may concern:*

Be it known that I, OTTO ERNST, Ph. D., chemist, a citizen of the Empire of Germany, residing at Höchst-on-the-Main, Germany, have invented certain new and useful Improvements in the Manufacture of Red Color-Lakes, of which the following is a specification.

I have found that the dichloro-anilin sulfonic acid obtained by nitrating monosulfonated orthodichloro-benzene and subsequently reducing or by sulfonating 3.4-dichloro-anilin yields when diazotized and combined with 2.3.6-beta-naphtholdisulfonic acid a dyestuff specially suitable for the manufacture of color-lakes distinguished by their great fastness to light and purity of the yellow-red shade.

Though the dyestuff contains three sulfo groups, the lakes are easily precipitated by the different methods and of very great fastness to water. They are specially suitable for wall and variegated paper printing, lithography, and painters' colors.

Example: Two hundred and sixty-six parts, by weight, of dichloro-anilin sulfonate of sodium are dissolved in the requisite quantity of water, to which is added a solution of sixty-nine parts, by weight, of sodium nitrite, and the mixture is run into dilute hydrochloric acid containing somewhat more than two equivalents—that is, about eighty parts, by weight of hydrogen chlorid. The temperature of the solutions may be 15° centigrade. The diazo-dichloro-benzene sulfonic acid thus formed is soluble with difficulty and separates for the greater part. The diazo compound is run into a solution of three hundred and sixty-five parts, by weight, of 2.3.6-beta-naphtholdisulfonate of sodium (R-salt) containing about one hundred and thirty grams of soda-ash. The dyestuff separates for the greater part as an orange-colored precipitate. The precipitation may be further completed by adding some common salt. When dry, the dyestuff is a brick-red powder, insoluble in absolute alcohol, soluble in water with a red-yellow color, its aqueous solution being hardly changed by adding mineral acids. By adding some common salt the dyestuff is precipitated.

Having now described my invention, what I claim is—

As a new product, the yellow-red monoazo dyestuff obtained by the action of diazotized 3:4-dichloro-anilin-6-sulfonic acid on 2:3:6-beta-naphtholdisulfonic acid having the formula:

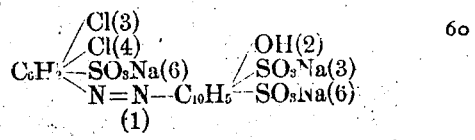

When dry, the dyestuff is a brick-red powder, insoluble in absolute alcohol, soluble in water with a red-yellow color; its aqueous solution being hardly changed by adding mineral acids; by adding common salt the dyestuff is precipitated.

In testimony that I claim the foregoing as my invention I have signed my name in presence of two subscribing witnesses.

OTTO ERNST.

Witnesses:
    ALFRED BRISBOIS,
    BERNHARD LYDECKER.